July 5, 1927.  
B. H. LAMPERT  
SECTIONAL TRACK CONSTRUCTION  
Filed Feb. 10, 1927

1,634,836

INVENTOR.  
Benjamin H. Lampert  
BY  
Louis O. French  
ATTORNEY.

Patented July 5, 1927.

1,634,836

UNITED STATES PATENT OFFICE.

BENJAMIN H. LAMPERT, OF OSHKOSH, WISCONSIN.

SECTIONAL-TRACK CONSTRUCTION.

Application filed February 10, 1927. Serial No. 167,175.

The invention relates to track construction and more particularly to track construction for use in connection with motor-driven vehicles.

Where trucks carrying heavy loads are used on soft ground as, for instance, in concrete highway construction where supply trucks for bringing the aggregate to the mixer have to pass over the subgrade to deposit their loads either into the loading skip of the mixer or adjacent thereto, this subgrade, because of the weight of the trucks and the frequent damp or muddy condition of the soil, does not provide a good foundation for the trucks and soon becomes badly rutted so that great difficulty is experienced in getting the trucks to the unloading point. The object of this invention is to provide a demountable or sectional track construction upon which the trucks may be driven over soft ground such as above noted, wherein each line of the track consists of a plurality of track sections of angular formation having a flange on the inner side of the track so that the track will take trucks with any width of tire in the rear since part of the tire, or in case of double tires one of the tires, may project beyond the track, said track sections being secured together at their ends and spaced apart to suit the inside wheel gauge of the trucks by spacing members removably connected with the track sections.

The invention further consists in the several features hereinafter set forth and more particularly defined by claims at the conclusion hereof.

In the drawings Fig. 1 is a side elevation view of a portion of a sectional track embodying the invention;

Figure 1:
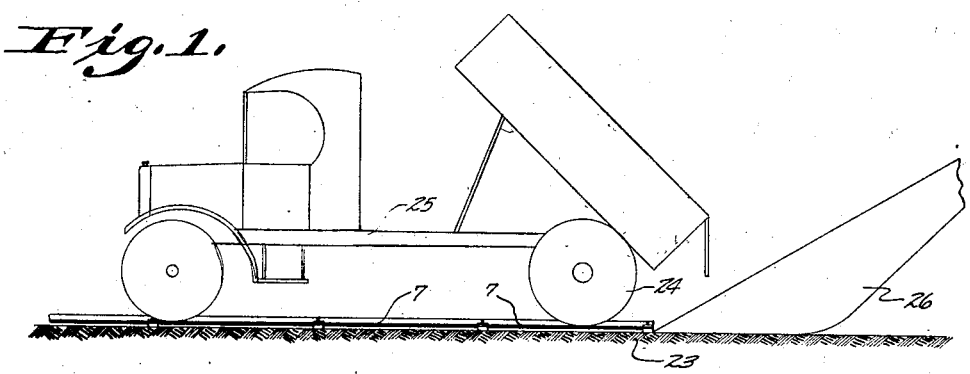
Figure 2:
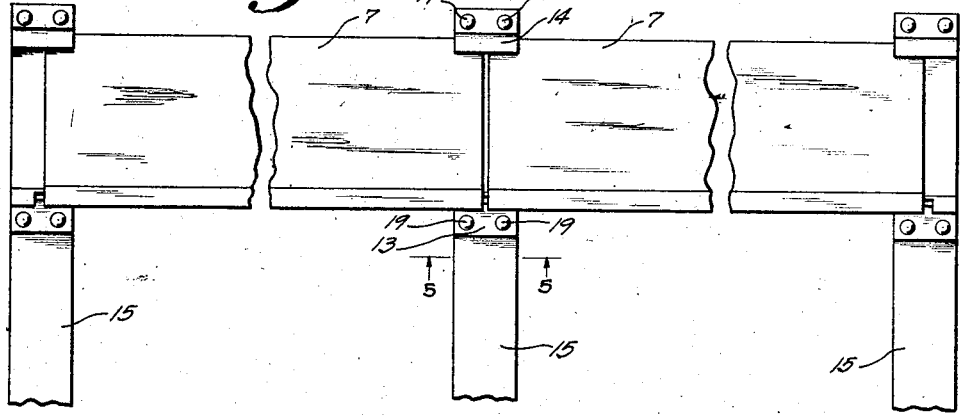
Fig. 2 is a plan view thereof, parts being broken away.
Figure 3:
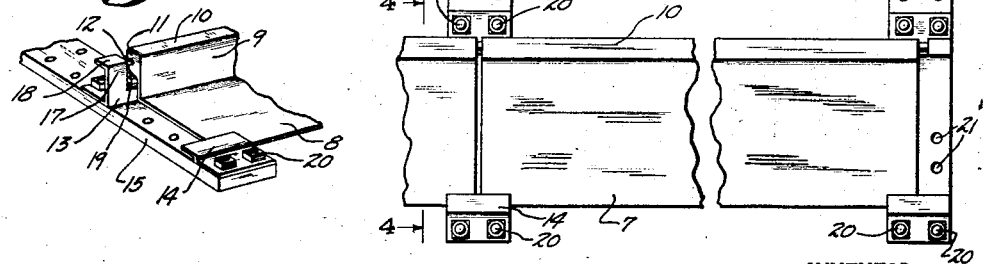
Fig. 3 is a perspective end view of one of the track sections associated with a spacing member.
Figure 4:
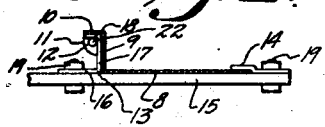
Fig. 4 is a section taken on the line 4—4 of Fig. 2.
Figure 5:
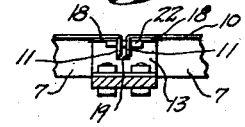
Fig. 5 is a detail sectional view taken on the line 5—5 of Fig. 2.

In the drawings the numeral 7 designates the track sections. Each of these track sections is preferably formed of sheet metal, such as heavy boiler iron, which is stamped or otherwise suitably formed into angle sections having a base portion 8 and an inner side portion 9 provided with a laterally-extending flange 10 and an ear 11 at each end of the track section which is welded or otherwise suitably secured to the inner side flange 9 of the track section and the flange 10 and is provided with a hole 12. Adjoining sections of the track are secured in alined position by an angle bracket 13 and a clip or angle lug 14, said bracket and lug being mounted on a support 15.

Each of the angle brackets 13 consists of a base portion 16, an upright portion 17 and a bifurcated flange portion 18 with a vertically disposed slot 19 between the bifurcations and extending down into the upright portion 17.

The angle lug 14 engages over the outer sides of the adjoining track sections and is spaced from angle bracket 13 to accommodate the width of each track section disposed therebetween. On one side of the track the bracket 13 and lug 14 may be fixedly secured to the support 15 in any suitable manner, as by rivets 19. On the other side of the track, in order to adjust the track to trucks of different wheel gauges, it is preferred to secure the angle bracket 13 and the lug 14 in spaced relation to each other and relative to the other side of the track by means of bolts 20 and the supports 15 are provided with a series of sets of holes 21 to permit of this adjustment.

While the supports 15 perform the double function of acting as a tie between track sections on each side of the track and as a spacing means for the track sections, it will be understood that separate bars similar to the supports 15 can be used to space the sides of the track apart without departing from this invention. Furthermore, it will be understood that the supports 15 are not load supports for the track as they have a relatively small bearing area and the weight of the truck is taken by the track sections themselves, the width of the channel being sufficient to take the load.

The adjoining track sections are secured together by the interfitting relation of the side portions of each section with the bracket 13 and lug 14, the disposition of the ears 11 against the inner sides of the bifurcations 18 and by pins 22 or other suitable fastening means which pass through the holes 12 in the ears of the adjoining track sections and preferably have a clamping engagement with the under side of the bifurcations 18, these pins 22 preferably having a slight taper so as to secure a good fit and to accommodate for possible slight inaccuracies of alinement between the adjacent track sections. The engagement of the ears 11 with the brackets 13 prevents longitudinal displacement of the track sections relative to each other and the connection of these sections with the brackets 13, lugs 14 and supports 15 prevents spreading of the lines of the track relative to each other.

In arranging the device for use the spacing members or supports 15 are laid upon the subgrade or soft soil 23 at appropriate intervals and the track sections 7 are placed so as to bring their ends between the spaced brackets 13 and lugs 14, with the ears 11 in position, and the pins 22 are then driven into place with the result that a track of sufficient bearing surface for the wheels 24 of a truck 25 is provided to enable the truck to negotiate the soft ground and deposit its load as, for instance, into the skip 26 of a mixer. Furthermore, since the track sections 7 have flanges on their inside portion only the track will take trucks with any width of tire in the rear or trucks with double tires and the track sections may be made relatively light.

While I have described the use of the track sections more particularly in connection with the soft soil of the subgrade of a road under construction, it will be understood that the track may be used for motor vehicles on any kind of soft ground where it is necessary to prevent vehicles from becoming mired.

I desire it to be understood that this invention is not to be limited to any particular form or arrangement of parts except in so far as such limitations are specified in the claims.

I claim:

1. In a track construction, the combination of a plurality of track sections, each having a base portion and an inner side flange, means for connecting adjacent ends of said track sections together to prevent longitudinal displacement thereof comprising an angle lug engageable with the outer side of the base portions of adjoining track sections and an angle bracket engageable with said flanges of adjoining track sections, and means for preventing lateral displacement of said track sections.

2. In a track construction, the combination of a plurality of track sections, each having a base portion and an inner side flange having laterally extending flange portions, a pair of spaced connectors between which adjoining track sections are disposed comprising a clip engageable with the outer side of the base portions of said sections, and a bracket having flanges engageable with the flanges of said track sections to prevent longitudinal movement of said track sections.

3. In a track construction, the combination of a plurality of track sections, each having a base portion and an inner side flange, a support, spaced connectors mounted on said support engageable respectively with the base portions and the flanges of adjoining track sections, and means engageable with the connectors of said flanges and said flanges for holding said sections in alinement.

4. In a track construction, the combination of a plurality of track sections, each having a base portion and an inner side flange, a spacing member, spaced sets of connectors mounted on said spacing member for adjustment relative to each other, each set of connectors having a connector engageable with the base portions of adjoining sections and a connector engageable with the flanges of adjoining track sections.

5. In a track construction, the combination of a plurality of track sections, each having a base portion and an inner side flange provided with a laterally extending apertured ear at each end, a support, a clip mounted on said support and fitting over the base portions of adjoining sections at the outer sides thereof, and a bracket mounted on said support and having a flange portion engageable with the ears of adjoining sections, and means extending through the openings in said ears and engaging said bracket.

In testimony whereof, I affix my signature.

BENJAMIN H. LAMPERT.